US006660940B1

(12) United States Patent
Emery

(10) Patent No.: US 6,660,940 B1
(45) Date of Patent: Dec. 9, 2003

(54) INSULATION INSERT FOR PREVENTING STRAND-TO-STRAND CONTACT IN HIGH-VOLTAGE COILS

(75) Inventor: Franklin T. Emery, Fort Payne, AL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 10/186,835

(22) Filed: Jul. 1, 2002

(51) Int. Cl.⁷ .............................................. H01B 17/00
(52) U.S. Cl. ............................. 174/138 E; 174/138 G; 318/797; 318/832
(58) Field of Search ................... 174/138 E, 138 G; 242/430; 310/323.04; 318/797, 832

(56) References Cited

U.S. PATENT DOCUMENTS

| | | | |
|---|---|---|---|
| 4,853,577 A | * | 8/1989 | Holly, III .................... 310/260 |
| 5,093,543 A | * | 3/1992 | Patton et al. ............ 174/138 E |
| 6,124,659 A | * | 9/2000 | Rowe et al. ................. 310/214 |
| 6,228,494 B1 | * | 5/2001 | Emery ......................... 428/377 |

* cited by examiner

Primary Examiner—Dean A. Reichard
Assistant Examiner—W. David Walkenhorst

(57) ABSTRACT

An insulation insert (40) is provided for preventing electrical shorts and/or arcing between adjacent strands in a stator coil. The insulation insert includes a thin base (42) of substantially uniform cross section and a lead-in nose (43) formed in the thin base (42) for guiding the insulation insert (40) into a position between adjacent strands. The insulation insert (40) includes two substantially vertical cuts (45) in the thin base (42) above the lead-in nose (43), which delineate a center section (44) flanked by two ear portions (46). A head (54) and two wings (52) are formed in the insulation insert by folding the ear portions (46) along substantially horizontal creases (47).

4 Claims, 3 Drawing Sheets

INSULATION INSERT FOR PREVENTING STRAND-TO-STRAND CONTACT IN HIGH-VOLTAGE COILS

FIELD OF THE INVENTION

The present invention relates to insulation for preventing strand-to-strand contact in high-voltage coils, and more particularly to an insulation insert for preventing electrical shorts and/or arcing in high-voltage stator coils.

BACKGROUND

Stator coils used in modem generators, such as the ones illustrated in FIG. 1, are typically manufactured using a technique referred to as Roebelling to improve the electrical performance of the individual copper strands that make up a stator coil. Roebelling involves transpositioning of the individual copper stands in a stator coil, as illustrated in FIG. 2, to vary the radial position of each copper strand over the axial length of the stator coil. Without such transpositioning, copper strands closer the center of a generator would be subjected to higher magnetic flux densities, and thus higher temperatures and loses, than those located further from the center of the generator. By transpositioning the copper strands, Roebelling helps insure that each copper strand in a stator coil is exposed to comparable magnetic flux and temperature conditions.

In order to transpose the copper strands in a stator coil, one or more crimps or bends must be placed in each of the individual copper strands. A number of techniques exist for forming such crimps. One such technique, known as 3D-crimping, utilizes a three-dimensional crimp configuration like the one illustrated in FIGS. 3A and 3B.

FIGS. 3A and 3B illustrate two copper strands 32 that have been crimped using the 3D-crimping technique. The crimped-copper strands 32 include a number of individual crimps 34. These crimps 34 may be formed, for example, using a crimping fixture having a crimping die and an actuator. Once crimped, the copper strands 32 are assembled to form a transposed stator coil as illustrated in FIG. 3B.

In their assembled state, the copper strands 32 are packed closely together. Therefore, adjacent copper strands may contact each other or come into close proximity of each other. To prevent electrical shorts and/or arcing between adjacent copper strands, manufactures generally purchase and utilize copper strands that have been pre-coated with one or more thin layers of insulation coatings.

One problem with this appoach is that the insulation coatings are frequently damaged during the crimping process. If an insulation coating on a copper stand is damaged, the bare copper of the copper strands may be exposed, which may lead to electrical shorts and/or arcing between adjacent copper strands. The problem is made worse in 3D-crimp configurations because, as illustrated in FIGS. 3A and 3B, the crimps in one copper strand tend to line up with the crimps in an adjacent copper strand. Thus, electrical contact and/or arcing between adjacent strands is even more likely.

In an effort to overcome the problem described above, manufacturers often add an additional durable-varnish-insulation coating to the copper strands before assembly and crimping. This durable-varnish-insulation coating tends to withstand the crimping process. However, it also adds significant cost to the end product.

SUMMARY OF THE INVENTION

With the above in mind, an insulation insert consistent with the present invention is described that effectively prevents electrical shorts and/or arcing between adjacent copper stands, but significantly reduces the costs associated with conventional techniques.

An insulation insert consistent with the present invention is provided for preventing electrical shorts and/or arcing between adjacent strands in a stator coil. The insulation insert includes a thin base of substantially uniform cross section and a lead-in nose formed in the thin base for guiding the insulation insert into a position between adjacent strands. The insulation insert includes two substantially vertical cuts in the base above the lead-in nose, which delineate a center section flanked by two ear portions. The center section may be formed into a head by horizontally folding the center section at a point midway along the vertical cuts. The insulation insert may also include a substantially horizontal cut in each of said ear portions to facilitate bending of said ear portions in opposite directions to form opposing wings in said insulation insert.

DETAILED DESCRIPTION

The Insulation Insert

Figure 4A:
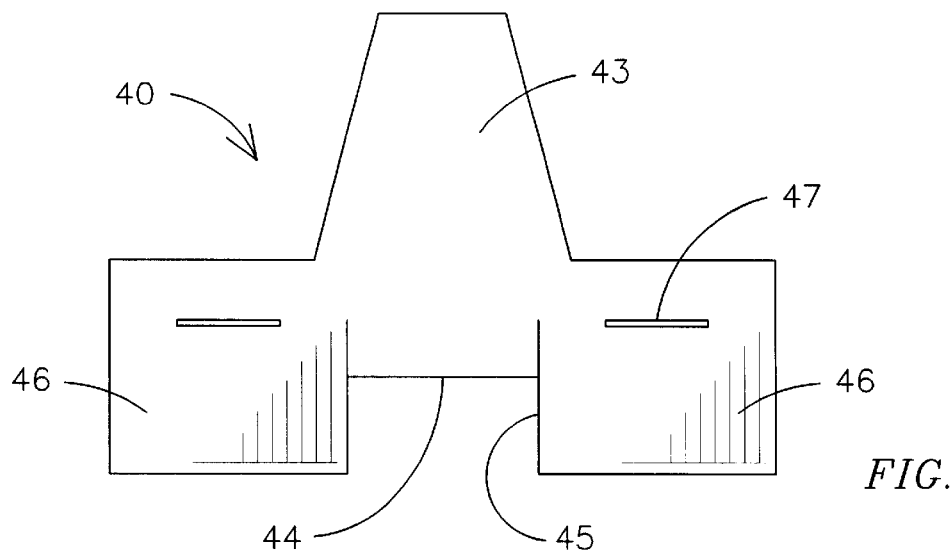
FIGS. 4A and 4B illustrate an insulation insert consistent with an exemplary embodiment of the present invention.
Figure 4B:
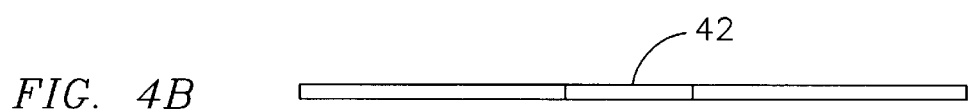

FIG. 4A and 4B illustrate an exemplary embodiment of an insulation insert 40 consistent with the present invention. The insulation insert has a thin base 42 of substantially uniform cross section. The base 42 may be formed, for example, from a thin sheet of insulation material that is sufficiently flexible to be bent and folded without fracturing. The material from which the base 42 is formed should be capable of withstanding temperatures up to about 155° C. The material should have good insulation characteristics that enable it to withstand voltages up to about 1000 VAC (volts alternating current). The material should also be sufficiently durable to withstand compression and tearing forces that arise during the assembly and use of the stator coil.

In the exemplary embodiment, the base 42 is formed from a sheet of Nomex™ 410 insulation, which is available from DuPont Corporation, Advanced Fibers Systems, 5401 Jefferson Davis Highway, Richmond, Va. 23234. However, one skilled in the ail will appreciate that the base 42 could be formed from any material with the characteristics discussed above. Additional examples of suitable materials include Kevlar™ insulation, which is also available from DuPont Corporation, Advanced Fibers Systems, 5401 Jefferson Davis Highway, Richmond, Va. 23234, and mica insulation.

As illustrated in FIG. 4A, the lower end of the insulation insert 40 includes a lead-in nose 43, which acts as a guide to help position the insulation insert 40 into position between adjacent copper stands during assembly of a stator coil. Above the lead-in nose 43 is a center section 44, which is formed from a portion of the base 42 that is located between two substantially vertical cuts 45 in the base 42. Above the lead-in nose 43, on both sides of the center section 44, are ear portions 46. Each ear portion 46 may include a substantially horizontal cut 47 to facilitate; horizontally bending the ear portions 46 at a consistent location.

The shape described above may be formed in the base 42 of the insulation insert 40, for example, by manually cutting the base 42 or, more preferably, by cutting the base 42 with a cutting die in an automated cutting fixture. Once the shape has been formed in the base 42, the insulation is folded to form the folded insulation insert illustrated in FIG. 5. The folded insulation insert 50 includes two opposing wings 52 that are formed in the two ear portions 46 by folding the ear portions 46 in opposite directions along a horizontal line corresponding to cuts, perforations, or creases 47. When the ear portions 46 are folded, a head 54 is also formed in the center section 44. Because of its position relative to the lead-in nose 43, the head 54 serves as an excellent handle or grip for use by a person inserting the insulation insert 40 into a stator coil. The resulting folded insulation insert is ready for assembly into a stator coil.

Assembly of the Insulation Insert

Figure 1:
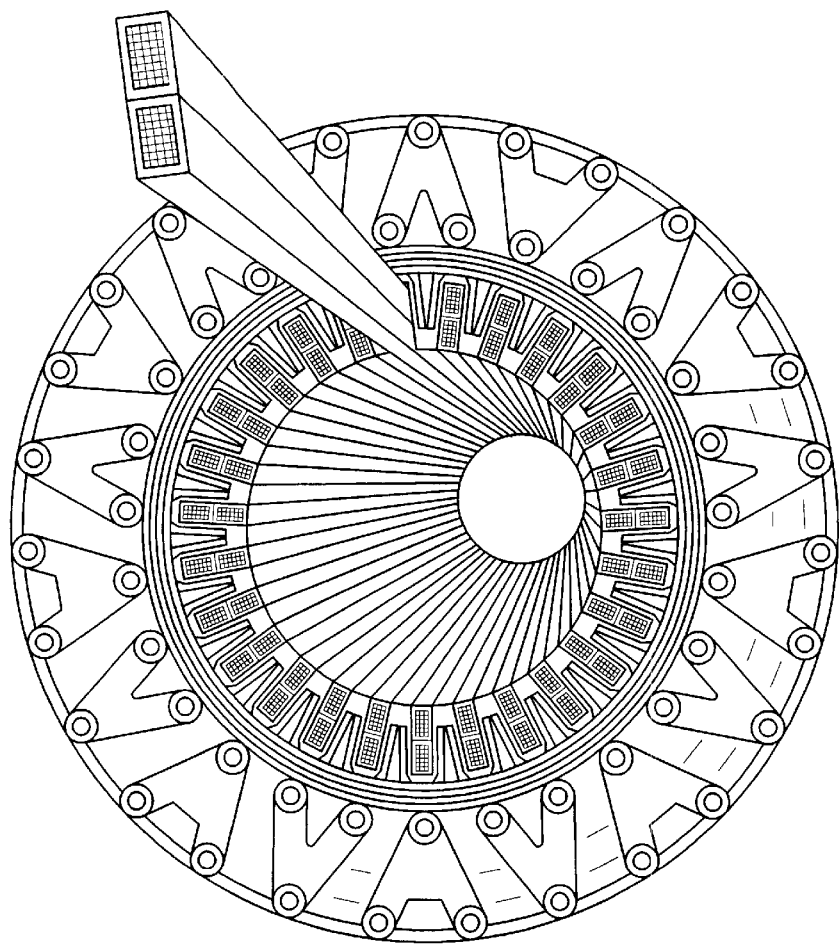
FIG. 1 illustrates stator coils in a conventional generator stator.
Figure 2:
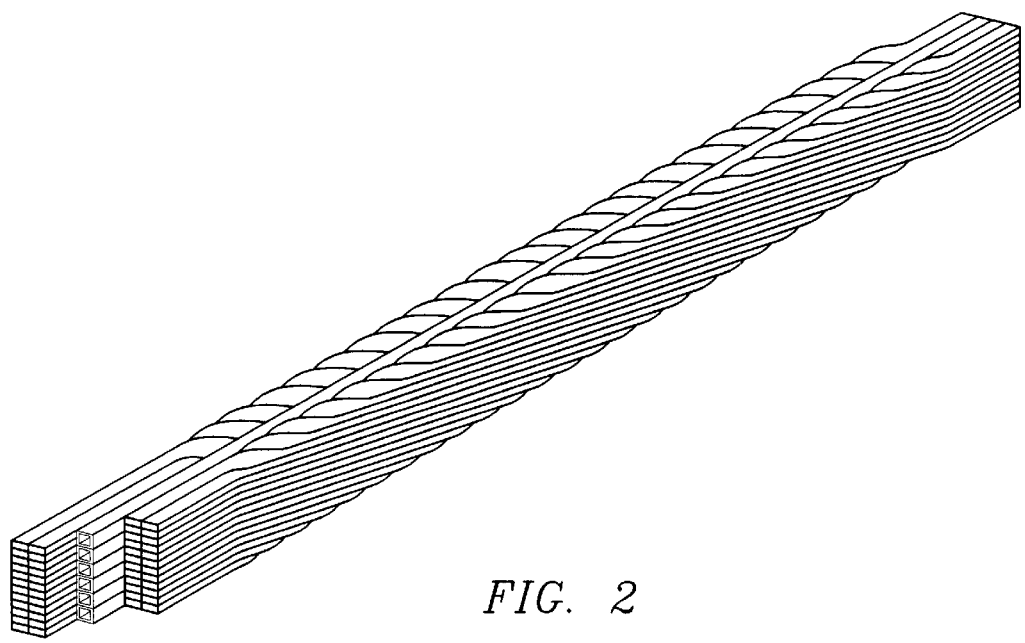
FIG. 2 illustrates a conventional Roebelled stator coil.
Figure 3A:
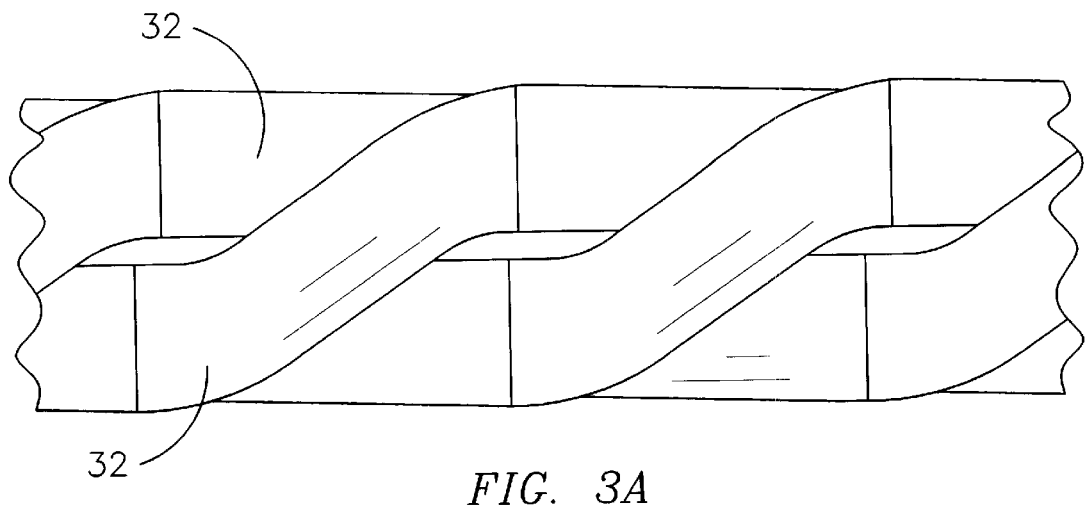
FIGS. 3A and 3B illustrate copper strands formed into a 3D-crimp configuration.
Figure 3B:
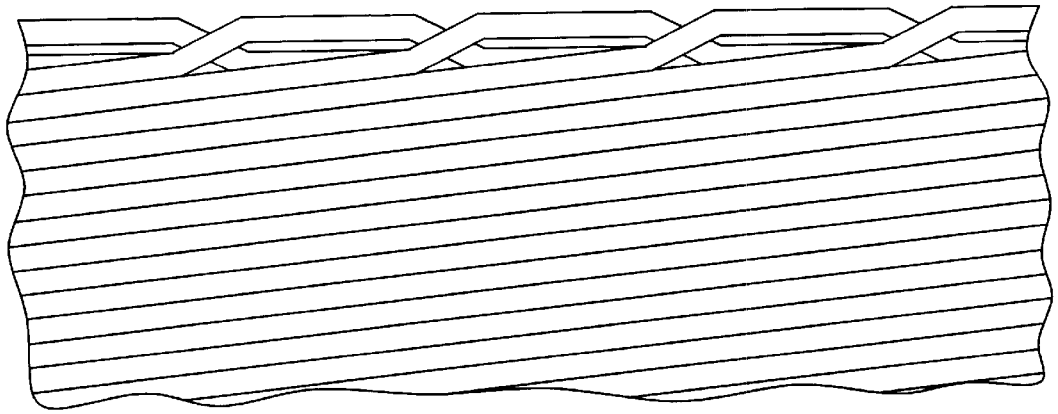
Figure 6:
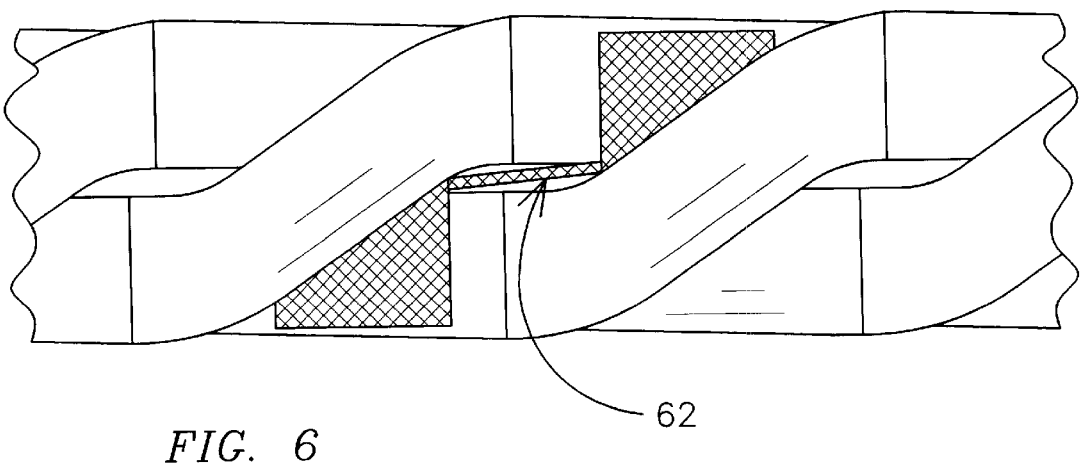
FIG. 6 illustrates the insulation insert of FIG. 5 after being inserted between copper strands in a 3D-crimp configuration.
Figure 5:
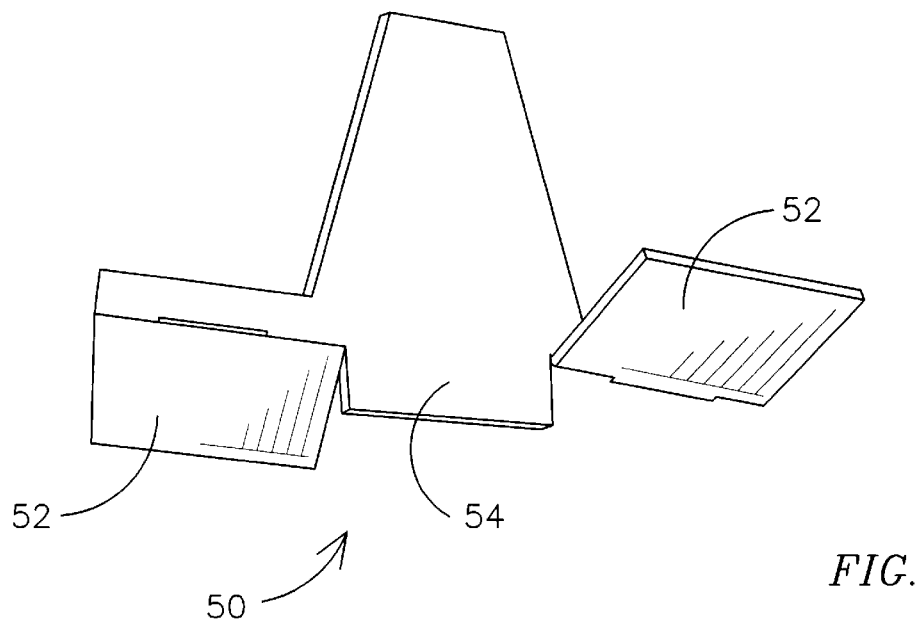
FIG. 5 illustrates a perspective view of the insert of FIGS. 4A and 4B.

Referring now to FIG. 6, a method of assembling the insulation insert into a stator coil will now be described. After being folded as shown in FIG. 5, the folded insulation insert is to be inserted between adjacent copper strands in a stator coil. This insertion is generally accomplished by a person, such a shop assembly worker.

The assembly worker begins installation of the folded insulation insert by grasping the folded insulation insert between his or her fingers at the head of the folded insulation insert. The assembly worker then inserts the lead-in nose of the folded insulation insert into the gap 62 in the stator coil and guides the wings of the folded insulation insert into position between adjacent copper strands, as illustrated in FIG. 6.

The exemplary embodiment described above is only one of many possible embodiments consistent with the present invention. Thus, the scope of the present invention should be determined with reference to the appended claims and their legal equivalents, rather than the specific example given.

What is claimed is:

1. An insulation insert for preventing electrical contact or arcing between adjacent strands in a stator coil, comprising:

a thin base of substantially uniform cross section;

a lead-in nose formed in said thin base for guiding said insulation insert into a position between said adjacent strands;

two substantially vertical cuts in said thin base above said lead-in nose delineating a center section flanked by two ear portions; and a substantially horizontal crease in each of said ear portions to form opposing wings in said insulation insert;

wherein said ear portions include substantially horizontal perforations to facilitate folding of said ear portions to form opposing, wings;

wherein said lead-in nose is tapered and sized to enable insertion of said lead-in nose between a first and second adjacent stack of copper strands; and wherein said ear portions are positioned above and wider than said lead-in nose to facilitate insertion of said folded wings at least partially under crimped portions of said copper strands.

2. The insulation insert of claim 1, wherein said thin base comprises a material selected from the group consisting of Nomex™ 410 insulation, Kevlar™ insulation, and mica insulation.

3. The insulation insert of claim 1, wherein said center section is folded along a substantially horizontal line at a point midway along said vertical cuts to form a head for facilitating insertion of said insulation insert between said adjacent strands.

4. The insulation insert of claim 1, wherein said ear portions include substantially horizontal perforations to facilitate folding of said ear portions to form opposing wings.

* * * * *